United States Patent [19]

Parker et al.

[11] Patent Number: 5,018,798

[45] Date of Patent: May 28, 1991

[54] ISOLATION VALVE

[75] Inventors: Donald L. Parker, Middletown; Donald M. Flory, Arcanum, both of Ohio

[73] Assignee: General Motors Corporation, Detroit, Mich.

[21] Appl. No.: 360,844

[22] Filed: Jun. 1, 1989

[51] Int. Cl.⁵ ............................................. B60T 8/46
[52] U.S. Cl. .................................... 303/117; 303/92; 303/114
[58] Field of Search ............... 303/92, 110, 113, 114, 303/115, 116, 117, 119

[56] References Cited

U.S. PATENT DOCUMENTS 4,685,749 8/1987 Otsuki et al. .................. 303/116
4,859,001 8/1989 Parker et al. .................. 303/92

Primary Examiner—Duane A. Reger
Attorney, Agent, or Firm—Ernest E. Helms

[57] ABSTRACT

An anti-lock braking system (ABS) actuator isolation valve and method of utilization thereof is provided to ensure that a braking system master cylinder, which is normally connected with wheel brake cylinder and isolated from the same when the braking system is an ABS mode, is never fluidly exposed with a displacement cylinder, which can alternatively be connected with the wheel brake cylinder when the braking system is in the ABS mode.

4 Claims, 3 Drawing Sheets

ISOLATION VALVE

FIELD OF THE PRESENT INVENTION

This invention relates to a hydraulic pressure actuated wheel lock control system isolation valve and method of utilization thereof. The isolation valve of the present invention is particularly useful in the environment of the wheel lock control system described in copending commonly assigned now U.S. Pat. No. 4,859,001, now U.S. Pat. NO. 4,822,112, and the disclosures of the aforementioned patent applications are incorporated herein. However, the isolation valve of the present invention, may be utilized on other vehicle anti-lock braking systems (ABS).

DISCLOSURE STATEMENT

Referring to FIG. 2, it is desirable that the master cylinder inlet 22 never be fluidly exposed to the displacement chamber 111. Slight exposure can occur when the isolation valve 40 moves to the left contacting ball 78 and lifting the same from seat 66. Before the ball 78 mates with seat 76, for a short interim period the master cylinder inlet 22 may be fluidly exposed with the displacement chamber 112 via passage 88 and port 84.

SUMMARY OF THE INVENTION

The present invention provides an isolation valve and method of utilization thereof wherein in a first position the master cylinder 22 is fluidly connected with the wheel cylinder port 26 (also referred to as inlet or connection), and wherein the displacement chamber 112 in ABS operation is fluidly connected with the wheel cylinder 26. However, at no time can the master cylinder inlet 22 be fluidly connected with the displacement chamber 112. In a preferred embodiment of the present invention, the flow from the master cylinder to the wheel chamber is throttled prior to being cut off.

It is an object of the present invention to provide an isolation valve and a method of utilization thereof.

Further objects and advantages of the present invention can become more apparent to those skilled in the art as the nature of the invention is better understood from the accompanying drawings and a detailed description.

DETAILED DESCRIPTION OF THE DRAWINGS

Figure 1:
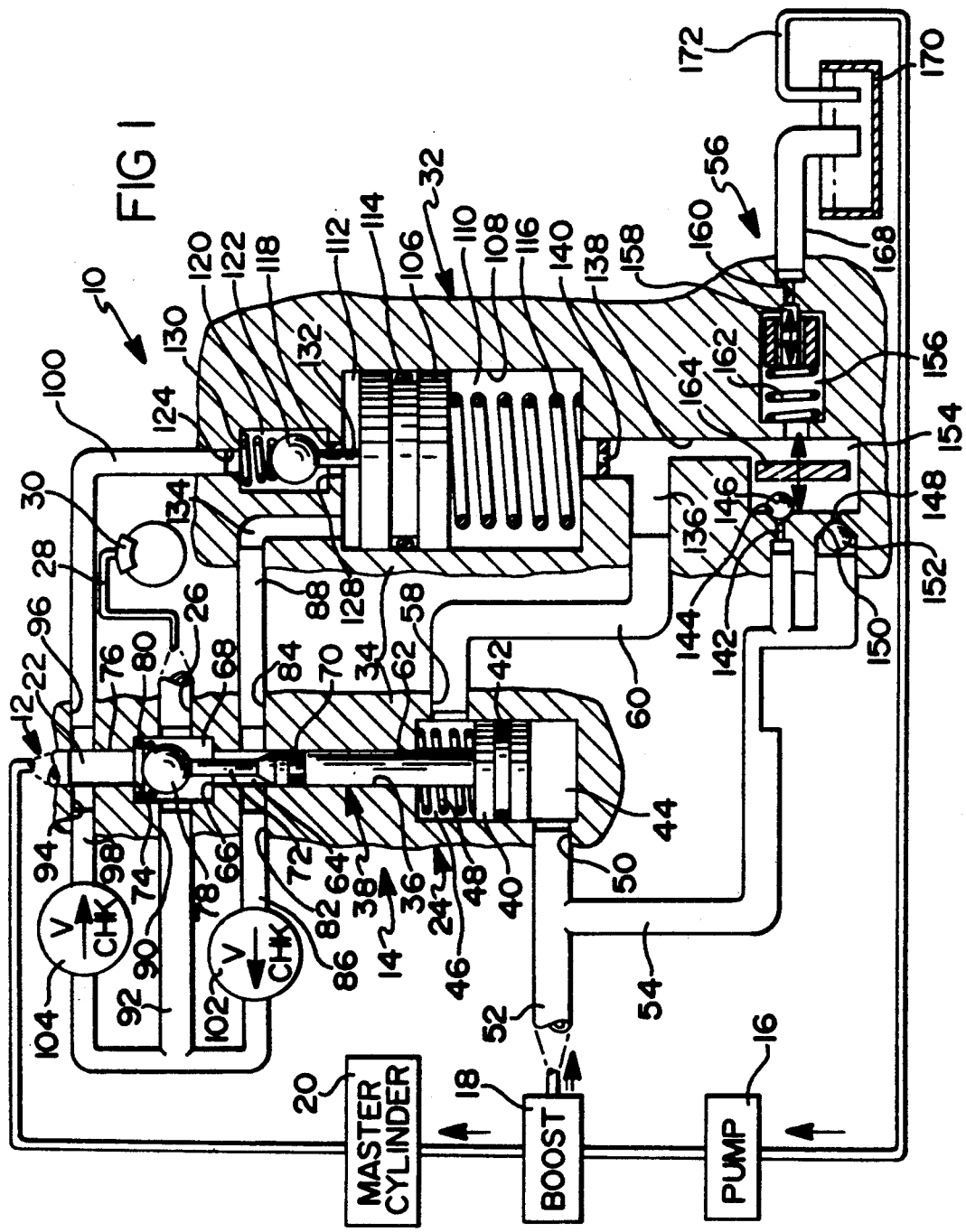
FIG. 1 is a sectioned view of a preferred embodiment isolation valve according to the present invention.

The wheel braking system 10 of FIG. 1 is schematically illustrated as including a service braking section 12 and an ABS section 14. Portions of system 10 are parts of both sections 12 and 14 where those sections overlap in function. Service braking section 12 includes a pump 16 which provides brake fluid under pressure to the booster 18. In turn, the booster actuates the master cylinder 20 when the service brake section is operated by the vehicle operator. The master cylinder brake actuating fluid pressure is then transmitted to port 22 (note the terms "port", "inlet" and "fluid connections" are used interchangeably herein,) of the isolation valve assembly 24. Isolation valve assembly 24 is primarily a part of the ABS section 14, but has certain ports and passages which are also connected as a part of the service braking section 12. In particular, the isolation valve assembly port 26 is connected to conduit 28, which in turn is connected to a wheel brake 30. It is to be understood that in some vehicle braking systems, there may be more than one wheel brake connected with conduit 28. Likewise, separate isolation valve assemblies 24 and displacement cylinder assemblies 32 may be provided for individual wheel brakes, or only some of the individual wheel brakes, of a vehicle.

Figure 2:
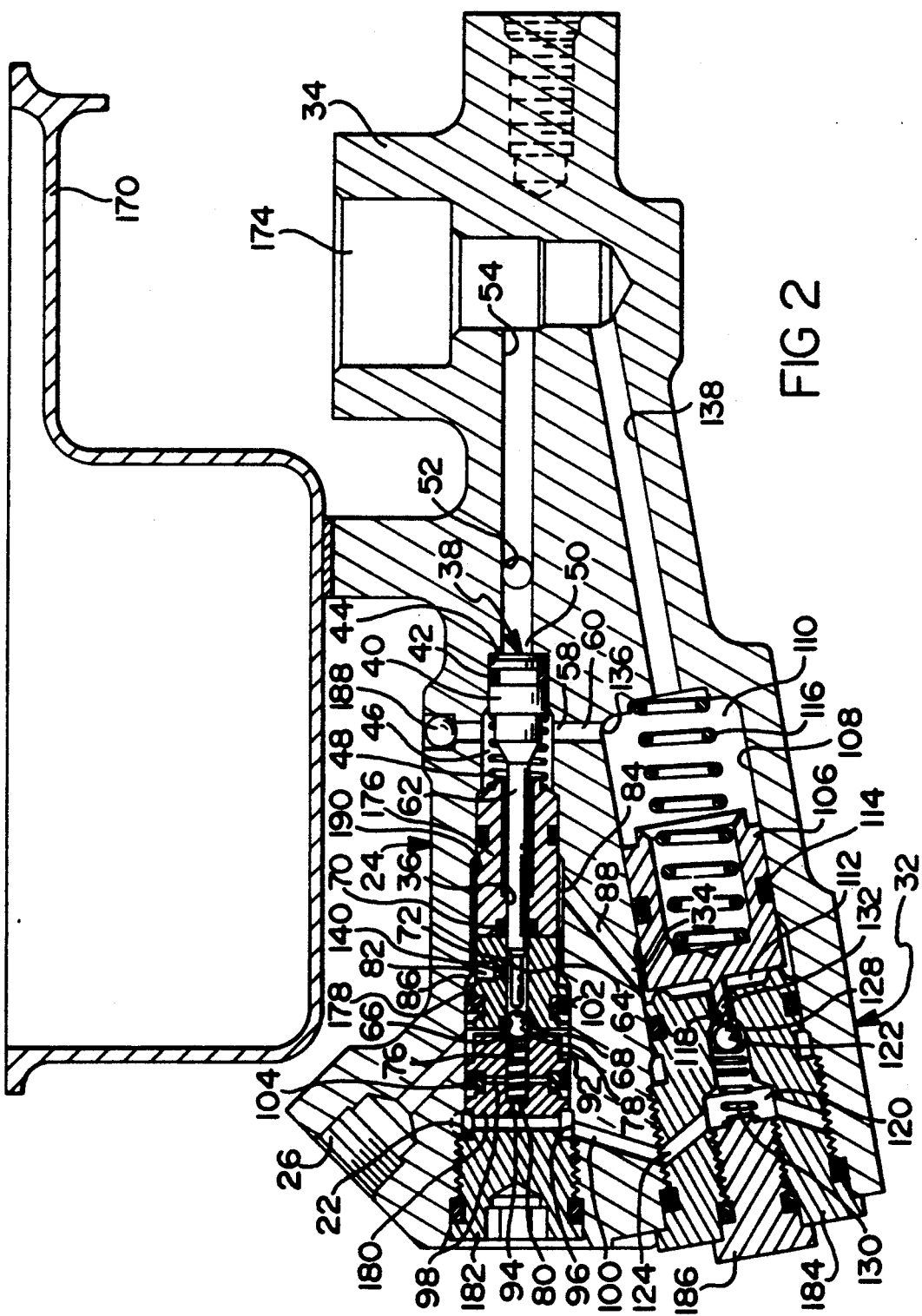
FIG. 2 is a sectional view of an ABS braking system illustrating the environment of the present invention.

The ABS section 14 of system 10 includes the isolation valve assembly 24 and the displacement cylinder assembly 32. As sown in FIG. 1, these two assemblies may be in a common housing 34. The isolation valve assembly 24 has a bore 36 which as illustrated in FIG. 2 is a stepped bore. In the schematic illustration of FIG. 1, bore 36 is divided into various passages and chambers as will be further described. An isolation valve piston and stem element 38 is reciprocably received in bore 36. Element 38 has a piston end 40 provided with a seal 42, the piston end being received in one end of bore 36 which is enlarged and divided into chambers 44 and 46 by the piston end 40. A spring 48 in chamber 46 urges piston end 40, and therefore element 38, downwardly as seen in FIG. 1, tending to increase the volume of chamber 46 and decrease the volume of chamber 44. Chamber 44 is connected by port 50 to passage 52, which receives boost actuating pressure from the booster 18. Another passage 54 is connected with passage 52 and the solenoid valve assembly 56 which also forms a part of the ABS section 14.

Chamber 46 is connected by port 58 to passage 60. Element 38 includes a stem 62 which extends from piston end 40 through a reduced diameter portion of bore 36 into a third chamber 64, then through a valve seat 66 into a fourth chamber 68 which is the isolation valve chamber. Stem 62 is sealed relative to the wall of bore 36 by a seal 70. The stem has a further reduced diameter end 72 which is the portion of the stem extending through chamber 64 and valve seat 66 into chamber 68. The reduced diameter end 72 of the stem is sufficiently small relative to the portion of bore 36 through which it extends to permit flow thereabout. Beyond chamber 68, bore 36 is again reduced to provide a valve seat 74 at the other end thereof from seat 66. The passage 76 extending from valve seat 74 to port 22 is also formed by a part of bore 36.

A ball check valve 78 is contained in valve chamber 68 and is continually urged toward valve seat 66 by a valve spring 80. The ball check valve 78 is also engaged by the end of the stem reduced diameter end 72 so that upward movement of the stem as shown in FIG. 1 can move the ball check valve against the force of valve spring 80 seating the ball check valve on valve seat 74 and closing off the fluid communication between passage 76 and valve chamber 68. When piston and stem element 38 is in the downward position, ball check valve 78 is in valve seating engagement with valve seat 66 so as to close off fluid communication between valve chamber 68 and chamber 64.

Ports 82 and 84 respectively connect passages 86 and 88 with chamber 64. Port 90 connects valve chamber 68 with passage 92, and port 26 connects valve chamber 68 with conduit 28. Ports 94 and 96 respectively connect passages 98 and 100 with the passage 76. Check valve 102 is positioned so that passage 86 is connected with the check valve inlet and passage 92 is connected with the check valve outlet. Check valve 104 is positioned so that passage 92 is connected with the check valve inlet and passage 98 is connected with the check valve outlet. The check valves 102 and 104, schematically illustrated in FIG. 1, are provided as V-block seal type check valves in the construction shown in FIG. 2.

The displacement cylinder assembly 32 has a displacement piston 106 reciprocably received in a cylinder defined by cylinder wall 108 in housing 34. Piston 106 divides that cylinder into a chamber 110 on one side of the piston and chamber 112 on the other side of the piston. The piston has a suitable seal 114 which prevents fluid communication between chambers 110 and 112 between through any clearance between the outer surface of piston 106 and cylinder wall 108. A piston spring 116 is positioned in chamber 110 so as to continually urge piston 106 in a direction tending to increase the volume of chamber 110 and decrease the volume of chamber 112.

An opening 118 from chamber 112 provides fluid communication to a valve chamber 120 in which is mounted the ball check valve 122. This valve is the master cylinder bypass valve to which the invention herein disclosed and claimed in particularly directed. Valve chamber 120 is connected with passage 100 by port 124, which opens into chamber 120. Opening 118 opens into valve chamber 120 through valve seat 128. Valve spring 130 continually urges valve 120 toward valve seat 128. Displacement piston 106 is provided with an extension 132 which extends through opening 118 into engagement with valve 120. Extension 132 is sufficiently smaller in diameter than opening 118 to permit fluid flow through the opening between chambers particularly shown in the above noted application, two solenoids are provided to separately control the movements and positions of valve 158 and valve control 164. When the solenoids (not shown) of valve assembly 56 are selectively energized, check valve control 164, positioned for movement in chamber 154 to hold check valve 146 closed or permit it to open, and valve 158 are moved leftwardly as seen in FIG. 1. The solenoid which particularly moves valve control 164 will urge it leftwardly as schematically shown in FIG. 1 for the release and hold positions. Otherwise the valve control 164 is positioned rightwardly to the apply position. In this position the check valves 146 and 152 may be moved toward or away from their seats in response to pressures on opposite sides thereof. Valve 158 is normally closed when its solenoid is energized, it is opened to release pressure in chambers 154, 110 and 46. Orifice 160 is connected by passage 168 to the fluid reservoir 170. This reservoir contains the fluid for the braking system and is the reservoir for the booster 18 and the master cylinder 20 as well as pump 16. It is noted that pump supply conduit 172 is schematically illustrated as conducting fluid from reservoir 170 to the inlet of pump 16 when that pump is operated.

The solenoid valve assembly 56 fits within the solenoid valve recess 174 of housing 34 as shown in FIG. 2. The solenoid valve assembly is not otherwise illustrated in FIG. 2. The comparable elements in FIG. 2 to those described and schematically illustrated in FIG. 1 have been assigned the same reference characters. The details of the construction in FIG. 2 are somewhat different since they are designed to permit assembly and disassembly and are in the nature of engineering drawing details. Therefore, for example, the isolation valve assembly 24 is provided with housing sections 176, 178 and 180 which are coaxially assembled within the stepped bore 190. Bore 190 and bore 36 of FIG. 2 are equivalent to bore 36 of FIG. 1. A plug 182 provides for the closure of one end of bore 36 through which the various elements of the isolation valve assembly are assembled and disassembled. Similarly, the displacement cylinder assembly 32 has a valve housing section 184 positioned in the outer end of the cylinder containing displacement piston 106. The outer portion of that cylinder is somewhat larger than the portion defined by cylinder wall 108 and cooperates with piston 106 as above-described. This slightly larger diameter section includes means for threading the valve housing section 184 into the housing 34 in which the cylinder is formed. A threaded plug 186 is threaded into an opening in the housing section 184 to permit installation and removal of the ball check valve 122 and the valve spring 130. Plug 186 also provides a seat for one end of that valve spring and defines a part of the valve chamber 120. Suitable seals are provided between the housing 34 and each of the plugs 182 and 186, and valve housing section 184. Because the port 58 is cross-drilled through bore 36, a plug 188 closes the outer end of the passage so formed. Also, the orifice 140 is located in another part of the system, being positioned in the portion of the circuit wherein it controls fluid flow from chamber 112 during the bypass release action of the system rather than controlling the supply of fluid pressure into chamber 110. It is therefore illustrated as being located immediately adjacent port 82 to control flow therethrough.

During normal service braking operation, the vehicle operator operates the booster and master cylinder to pressurize brake fluid for brake actuation. This brake actuating pressure fluid is transmitted to port 22. The isolation valve piston end 40 is positioned downwardly as viewed in FIG. 1 so that the ball check valve 78 is seated on its seat 66. Therefore, brake actuating pressure passes through passage 76, valve chamber 68, out port 26 and through conduit 28 to the wheel brake 30. When the master cylinder is released to release the brakes, fluid from the wheel brake flows in the opposite direction. In the normal braking condition the extension 132 is also positioned downwardly as the actuating brake fluid acts on the displacement piston 106, closing the ball check valve 122 against its valve seat 128. Since spring 116 is a light spring, only a relatively small amount of brake actuating pressure is required for this to occur.

In some systems the booster actuating pressure may be directly conducted to some wheel brakes so that they are actuated by booster pressure rather than master cylinder output pressure. In other systems, all of the wheel brakes may be service brake actuated master cylinder output pressures.

In normal wheel lock control action, the service brakes have been applied and a condition has occurred which requires the service brake actuating pressure to be limited, reduced or released, under control of the logic system of the particular ABS system being used. When the wheel brake actuating pressure is to be held at a certain value even though the master cylinder output pressure may be increasing to a greater value, the solenoid valve assembly has the solenoid actuated which will move the valve control 164 leftwardly, closing check valve 146 against its valve seat 144. This cuts off the boost pressure received from booster 18, that pressure normally passing through passage 52 to passage 54 and through orifice 142 to chamber 154 and passage 138 and thence through port 136, passage 60 and port 58 to chamber 46. Therefore boost pressure is not exerted in both chambers 44 and 46 as is the case in normal service braking.

The increase in boost pressure in chamber 44 moves isolation valve piston and stem element 38 upwardly as seen in FIG. 1, lifting ball check valve 78 from its seat 66 and engaging it with its seat 74. This therefore isolates master cylinder actuating pressure as contained in passage 76 from port 26 and conduit 28, and therefore from wheel brake 30, and holds the pressure in the wheel brake at the pressure existing at the time ball check valve 78 engages its ball seat 74. If the ABS system must reduce the pressure in the wheel brake 30, the solenoid controlling the valve 158 is then energized, moving that valve leftwardly as seen in FIG. 1 and opening release orifice 160. Therefore the fluid pressure in chamber 154 is open to reservoir 170 through chamber 156 and orifice 160. Therefore chamber 46 of the isolation valve assembly is also connected with the reservoir and chamber 110 for the displacement cylinder assembly is likewise connected to the reservoir. The wheel brake actuating pressure being held, being imposed in chamber 112 through passage 88 and its ports 84 and 134, therefore, moves the displacement piston 106 downwardly against its light piston spring 116, increasing the volume in chamber 112 and therefore decreasing the wheel brake actuating pressure to wheel brake 30. Orifice 140 provides an appropriate restriction to this action so that the action is not at a faster rate than that desired. If the ABS system then holds the wheel brake actuating pressure at a lower pressure it does so by deenergizing the solenoid for valve 158, letting spring 162 return it to the position wherein orifice 160 is closed. Thus the wheel brake actuating pressure is held at some lower pressure determined by the logic of the ABS system. If the wheel brake actuating pressure is to be reapplied to a higher pressure level, the solenoid controlling valve control 164 is deenergized and the boost pressure acting through passages 52, 54 and orifice 142 immediately open check valve 146 and boost pressure is again supplied to the displacement cylinder chamber 110 and the isolation valve chamber 46. With the wheel brake actuating pressure being on the opposite side of the displacement piston 106 from the boost pressure, the boost piston normally does not move up to the position where ball check valve 120 is removed from its valve seat 128.

Under some circumstances, if for example the system has been inadequately bled of air, the isolation valve may be quickly moved to the ABS position, cutting off master cylinder pressure to the wheel brake. However, there will be insufficient brake fluid pressure capable of being generated in the displacement cylinder chamber 112 because air in that portion of the system toward the wheel brake will merely be compressed rather than acting through the relatively incompressible brake fluid. When this occurs, the displacement piston 106 moves upwardly to the piston shown in FIG. 1, opening ball check valve 120 and therefore providing a direct connection of the master cylinder to the wheel brake even though the isolation ball check valve 78 remains seated on its upper seat 74. This connection is then through passage 100, valve chamber 120, displacement chamber 112, passage 88, chamber 64, valve chamber 68 and conduit 28. Therefore, even though at this time the ABS system is being positioned to control wheel brake actuating pressure, it cannot do so because of the unabled air in that portion of the system and insufficient brake pressure may be generated for vehicle control purposes while the system remains in this condition. It is therefore better under these circumstances to actuate the wheel brake service brake actuating pressure, bypassing the ABS control section in this manner. When the ABS control section deenergizes the solenoids of the valve assembly 56, the system will return to the service brake operating condition as earlier described. While not shown, the ABS control system will develop signals indicating that the system is not operating properly and the operator of the vehicle will therefore be informed that the brake system should be checked. Any time a brake system is being checked, one of the conditions normally considered is to be sure that the air is bled from the service braking system. Once this is done, the condition which will cause the system to check-off as above-described will no longer exist and the system will again operate properly and there will be no need to open the ball check valve 120 during such operation.

It is to be noted that this arrangement returns the vehicle braking system to service braking operation and in no way adversely modifies the service braking operation. The vehicle braking system will therefore be operated in exactly the same manner that it would have operated if it had no ABS or wheel lock control system installed thereon.

Figure 3:
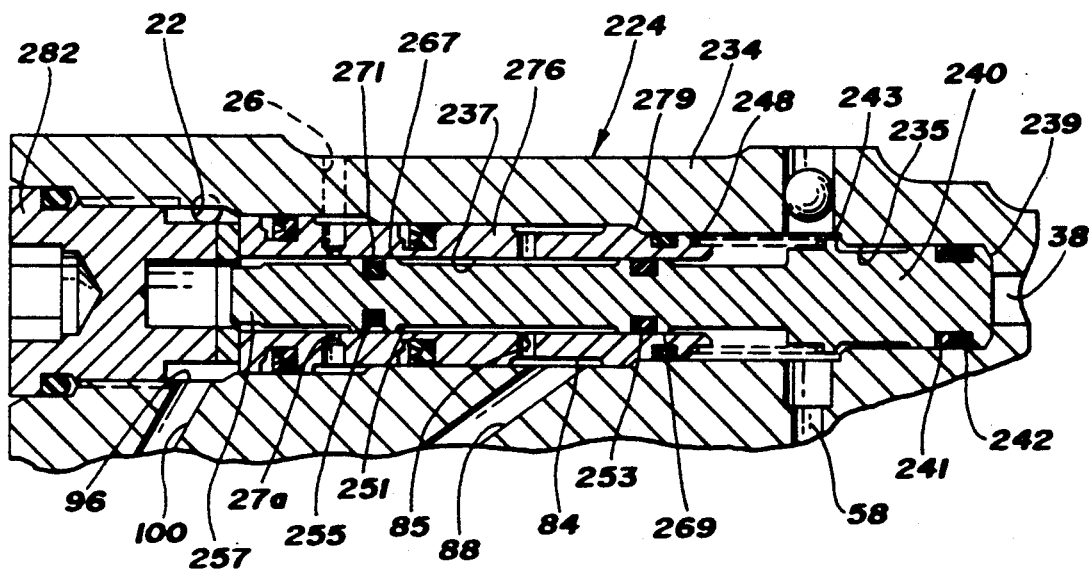
FIG. 3 is a schematic view illustrating operation of the anti-lock braking system illustrated in FIG. 2.

Referring to FIG. 3, the isolation valve 224 according to the present invention has housing or frame 234. The frame 234 has a central multi-diameter bore 235 extending therethrough. A plug 282 is threadably and sealably inserted for sealing the central bore 235. The central bore 235 has a pump pressure port or inlet 38, a solenoid valve controlled pressure inlet 58 which is releasable to a fluid vent or sump, a modulated pressure port 84 and a bypass port and passage 96 and 100, respectively. Port 22 is provided for connection with a master cylinder and port 26 is provided for connection to the wheel cylinder of the vehicle.

An end 239 of the bore 235 provides a stop. A sleeve 276 is held in position by plug 282 and has a shoulder region 279 to affix its position within the central bore 235. The sleeve 276 has an inner bore 237.

Slidably mounted within the sleeve 276 is a spool member 240. The spool 240 is spring biased against stop 239 to assume its first position by a spring 248. The spring 248 abuts upon the shoulder 243 of the spool and against the housing or sleeve member 276.

A first sealing means is provided by an O-ring 245 and a Teflon squared O-ring which are held in an angular groove 241 of the spool 240. The O-ring 245 and Teflon squared O-ring sealably separate the pump pressure inlet 38 from the solenoid control pressure inlet 58.

A second sealing means provided by an O-ring 253 which sealably separates the solenoid valve controlled pressure inlet 58 from the modulated pressure inlet or port 84. A third sealing means 255 provided by an O-ring and surrounding Teflon ring cooperates with the spool to sealably separate the modulated pressure port 84 from the wheel cylinder port 26 when the spool 240 is in its first position. Also when the spool 240 is in its first position there is free fluid passage between the master cylinder port 22 and wheel cylinder port 26.

When an ABS situation is initiated, the solenoid controlled pressure will be drastically reduced causing the pump pressure acting on the spool 240 to push the spool 240 leftward against the action of the spring 248. The leftward action of spool 248 causes multi-diametered end 57 of the spool 240 to throttle the flow of the fluid from the master cylinder portion 22 to the wheel cylinder 26.

The spool has two landings 267 and 269. As landing 269 moves leftward with the spool, fluid communication between the master cylinder and wheel cylinder will be drastically reduced until the point at the O-ring and Teflon seal 255 cross the port 26 wherein the wheel cylinder will now be totally isolated from the master cylinder. Teflon ring 271 is used over the O-ring to prevent wear of the O-ring passing over orifice 279 which connects with the wheel cylinder port 26. Again, at no time will the master cylinder port 22 be able to communicate with the modulated pressure port 84. Free fluid passage from port 84 to port 26 will occur via housing radial passage 85 and the valley 251.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A closed center isolation valve for an anti-lock braking system (ABS) system modulator, said system including a master cylinder, a wheel cylinder, a solenoid valve controlled pressure releasable to a sump, a pump pressure, and a modulator pressure, said valve in combination comprising:
    a frame with a central bore with fluid connections with said master cylinder, wheel cylinder, solenoid valve controlled pressure, pump pressure and said modulated pressure, said frame central bore having a first stop;
    a spool slidably mounted in said central bore spring biased to first position against said stop;
    a first seal means cooperating with said spool separating said pump pressure connection from said solenoid controlled pressure connection;
    a second seal means cooperating with said spool separating said solenoid pressure connection from said modulated pressure connection;
    a third seal means cooperating with said spool separating said modulated pressure connection whereby in a first spool position said third seal means seals said modulated pressure connection from said wheel cylinder connection allowing free flow from said master cylinder connection to said wheel cylinder connection and said third seal means when said spool is in an ABS mode seals and said modulated pressure connection from said master cylinder connection allowing free flow from said modulated pressure connection to said wheel cylinder connection and whereby said wheel cylinder connection is always separated from said modulated pressure connection by said third seal means.

2. An isolation valve as described in claim 1 wherein said valve in the process of being switched from said first to said ABS mode position, first throttles the flow from said master cylinder connection to said wheel cylinder connection before terminating said flow between said master cylinder connection and said wheel cylinder connection.

3. A close center isolation valve for an anti-lock braking system (ABS) modulator, said anti-lock braking system including a master cylinder, a wheel cylinder, a solenoid valve controlled pressure releasable to a sump, a pump pressure, and a modulated pressure, said valve in combination comprising:
    a frame with a central bore with fluid connections with said master cylinder, wheel cylinder, solenoid valve controlled pressure, pump pressure, and said modulated pressure, and said frame having a first stop within said central bore;
    a multi-diameter spool slidably mounted within said central bore and spring biased against said stop, said spool having a first encircling O-ring sealably separating said pump pressure connection from said solenoid control pressure connection;
    a second O-ring encircling said valve spool and moving therewith spring sealably separating said solenoid pressure connection from said modulated pressure connection; and
    a third O-ring encircling said valve spool and moving therewith separating said modulated pressure connection whereby in a first spool position, said O-ring seal means seals said modulated pressure connection from said wheel cylinder connection allowing free flow from said master cylinder connection to said wheel cylinder connection and when said spool moves away from said first position into an ABS mode position, said valve spool first controllably restricts flow from said master cylinder connection to said wheel cylinder connection and then said third O-ring seals said modulated pressure connection from said master cylinder connection allowing free flow from said modulated pressure connection to said wheel cylinder inlet and whereby said wheel cylinder connection is always separated from said modulated pressure connection by said third seal.

4. A method of isolating a master cylinder from a wheel cylinder in an anti-lock braking system (ABS) which includes a master cylinder, a wheel cylinder and solenoid valve controlled pressure releasable to a sump, a pump supplied pressure, and a modulated pressure in ABS mode, said method in combination comprising:
    slidably mounting a spool into a central bore of a frame having a stop and fluid connections with said master cylinder, wheel cylinder, solenoid valve controlled pressure, pump pressure, and said modulated pressure;
    spring biasing said spool against said first stop within said central bore;
    sealably separating said pump pressure connection from said solenoid controlled pressure connection with a first sealing means cooperating with said valve spool;
    sealably separating said solenoid controlled pressure connection from said modulated pressure connection with a second sealing means cooperating with said valve spool; and
    sealably separating said modulated pressure connection from said wheel cylinder connection when said spool is in a first position against said stop and thereby allowing free flow from said master cylinder connection to said wheel cylinder connection and whereby when said spool is moved in an ABS mode position, said third sealing means sealably isolate said master cylinder connection from said wheel cylinder connection and whereby in any position said master cylinder connection is isolated from said modulated pressure connection.

* * * * *